US007065549B2

(12) United States Patent
Sun et al.

(10) Patent No.: US 7,065,549 B2
(45) Date of Patent: Jun. 20, 2006

(54) COMMUNICATION AND PROCESS MIGRATION PROTOCOLS FOR DISTRIBUTED HETEROGENEOUS COMPUTING

(75) Inventors: Xian-He Sun, Darien, IL (US); Kasidit Chanchio, Knoxville, TN (US)

(73) Assignee: Illinois Institute of Technology, Chicago, IL (US)

( * ) Notice: Subject to any disclaimer, the term of this patent is extended or adjusted under 35 U.S.C. 154(b) by 746 days.

(21) Appl. No.: 10/293,981

(22) Filed: Nov. 13, 2002

(65) Prior Publication Data

US 2003/0187915 A1 Oct. 2, 2003

Related U.S. Application Data

(60) Provisional application No. 60/369,025, filed on Mar. 29, 2002.

(51) Int. Cl.
    *G06F 15/16* (2006.01)
(52) U.S. Cl. .................. 709/201; 709/201; 709/202; 709/203; 709/227; 709/228; 709/229; 715/15
(58) Field of Classification Search ........ 709/201–203, 709/227–229; 714/15
    See application file for complete search history.

(56) References Cited

U.S. PATENT DOCUMENTS

| 4,823,261 | A |   | 4/1989  | Bank et al.        |         |
|-----------|---|---|---------|--------------------|---------|
| 5,313,647 | A |   | 5/1994  | Kaufman et al.     |         |
| 5,319,648 | A |   | 6/1994  | Bux et al.         |         |
| 5,369,570 | A |   | 11/1994 | Parad              |         |
| 5,630,047 | A |   | 5/1997  | Wang               |         |
| 5,692,121 | A |   | 11/1997 | Bozso et al.       |         |
| 5,787,245 | A |   | 7/1998  | You et al.         |         |
| 5,872,786 | A |   | 2/1999  | Shobatake          |         |
| 5,922,078 | A |   | 7/1999  | Hirayama et al.    |         |
| 5,951,694 | A | * | 9/1999  | Choquier et al.    | 714/15  |
| 5,987,247 | A |   | 11/1999 | Lau                |         |
| 6,031,993 | A |   | 2/2000  | Andrews et al.     |         |
| 6,047,323 | A | * | 4/2000  | Krause             | 709/227 |
| 6,145,066 | A |   | 11/2000 | Atkin              |         |
| 6,154,877 | A |   | 11/2000 | Ramkumar et al.    |         |
| 6,161,219 | A |   | 12/2000 | Ramkumar et al.    |         |
| 6,167,427 | A | * | 12/2000 | Rabinovich et al.  | 709/201 |
| 6,189,111 | B1|   | 2/2001  | Alexander et al.   |         |
| 6,192,514 | B1|   | 2/2001  | Lurndal            |         |
| 6,269,442 | B1|   | 7/2001  | Oberhauser et al.  |         |

(Continued)

OTHER PUBLICATIONS

Sun Xian-He, Chanchio K., A Protocol Design of Communication State Transfer for Distributed Computing, Apr. 16, 2001, Dept. of Computer Science, Illinois Institute of Technology, Chicago, IL, USA, pp. 715-718.*

(Continued)

*Primary Examiner*—Khanh Dinh
*Assistant Examiner*—Saket K. Daftuar
(74) *Attorney, Agent, or Firm*—Pauley Petersen & Erickson

(57) ABSTRACT

Communication and Process Migration Protocols instituted in an independent layer of a virtual machine environment allow for heterogeneous or homogeneous process migration. The protocols manage message traffic for processes communicating in the virtual machine environment. The protocols manage message traffic for migrating processes so that no message traffic is lost during migration, and proper message order is maintained for the migrating process. In addition to correctness of migration operations, low overhead and high efficiency is achieved for supporting scalable, point-to-point communications.

17 Claims, 9 Drawing Sheets

U.S. PATENT DOCUMENTS

| | | |
|---|---|---|
| 6,272,556 B1 | 8/2001 | Gish |
| 6,442,663 B1 | 8/2002 | Sun et al. |
| 6,988,125 B1 * | 1/2006 | Elnozahy et al. ........... 709/203 |

OTHER PUBLICATIONS

Sun, X.H and Chanchio K, Communication State Transfer for Mobility of Concurrent Heterogeneous Computing, Sep. 2001, Proceedings of the 2001 International Conference on Parallel Processing.*

Sun, X.H and Chanchio K,: Data Collection and Restoration for Heterogeneous Process Migration, Jul. 2002, Software Practices and Experiences, vol. 32, No. 9, pp. 845-871.*

Satoh, I: Dynamic Configuration of Agent Migration Protocols for the Internet, Jan. 2002, National Institute of Informatics, Japan Sci.& Tehcnology Corp., Tokyo, Japan, pp. 119-126.*

Autrang, G and Li Xining: On the Implementation of an Agent-Migration Protocol, May 2003, Electricail and Computer Engineering, IEEE CCECE 2003, Canada, vol. 2, pp. 691-694.*

Gupta, Indranil: On the Design of Distributed Protocols from Differential Equation, 2004, Annual ACM symposium on Principles of Distributed Computeing, ACM Canada 2004, pp. 216-225.*

K. Chanchio and X. H. Sun: *Communication State Transfer for Mobility of Concurrent Heterogeneous Computing*, Proceedings of the 2001 International Conference on Parallel Processing, Sep. 2001.

Kasidit Chanchio and Xian-He Sun: *Data Collection And Restoration For Heterogeneous Process Migration*, Software Practice and Experiences, vol. 32, No. 9, pp. 845-871, Jul. 25, 2002.

K Chanchio and X.-H. Sun: *MpPVM: A Software System For Non-Dedicated Heterogeneous Computing*, Proceedings of 1996 International Conference on Parallel Processing, Aug. 1996.

K Chanchio and X.-H. Sun: *Memory Space Representation For Heterogeneous Networked Process Migration*, $12^{th}$ International Parallel Processing Symposium, Mar. 1998.

S. White et al.,: *Performance of the NAS Parallel Benchmarks on PVM based Networks*, Tech. Rep. RNR-94-008, Emory University, Department of Mathematics and Computer Science, May 1994.

Jeremy Casas et al.: MPVM: A Migration Transparent Version of PVM, *Computing Systems*, USENIX and The MIT Press, vol. 8, No. 2, pp. 171-126, Spring 1995.

Georg Stellner: *CoCheck: Checkpointing and Process Migration for MPI*, Proceedings of IPPS '96, The 10th International Parallel Processing Symposium, Honolulu, Hawaii, USA. IEEE Computer Society, pp. 526-531, Apr. 15-19, 1996.

K. Chanchio and X. H. Sun: *Data Collection and Restoration for Heterogeneous Process Migration*, Proceedings of 2001 International Parallel and Distributed Processing Symposium (IPDPS 2001), Apr. 2001.

* cited by examiner

Send(m, dest)
1: if(dest ∉ Connected) then
2:     cc[dest]=connect(dest);
3: end if
4: send m along the cc[dest] communication channel;

send algorithm

FIG.3

Connect(dest)
1: while (dest ∉ Connected) do
2:     send conn_req to pl[dest];
3:     if (receive conn_ack from pl[dest]) then
4:         cid:=make_connection_with(pl[dest]);
5:         Connected:={dest} ∪ Connected;
6:     else if (receive conn_req from any process P) then
7:         grant_connection_to(P);
8:     else if (receive conn_nack from pl[dest]) then
9:         consult scheduler for exe <u>status</u> and <u>new_vmid</u> of $P_{dest}$
10:        if (status=migrate) then
11:            pl[dest]:=<u>new_vmid</u> ;
12:        else report "error: destination terminated";
13:            return error; end if;
14:    end if; end if; end while;
15: return cid;

connect function

FIG.4

```
recv( src, m, tag)
1:  while (m is not found) do
2:      if (m is found in received_message_list) then
3:              return m, delete it from the list, and return to a caller function;
4:      end if
5:      get a new data or control message, n;
6:      if(n is data message) then
7:              append n to received_message_list;
8:      else (handle control messages)
9:              if(n is con_req) then
10:                     grant_connection_to(sender of n);
11:             else if n is peer_migrating then
12:                     close down the connection with sender of peer_migrating;
13:     end if; end while;
``` receive algorithm

FIG.5 migrate()
1: if(migrate_request is received)then
2:     inform the scheduler migration_start;
3:     get <u>new_vmid</u> of $P_i$ from scheduler;
4:     All con_req arrived beyond this point will be rejected;
5:     Send disconnection signal and peer_migrating
6:     Receive incoming messages to receive-message-list until getting end-of-messages
7:     close all existing connections;
8:     Send received-message-list to the new process;
9:     perform exe and memory state collection;
10:     Send the exe and memory state to the new process;
11:     wait for migration_commit msg from scheduler;
12:     cooperate with the virtual machine daemon to make sure that no more con_req control messages left to reject;
13:     terminate;
14: end if The migrate() algorithm on the migrating process.

FIG.6

Process: $P_i$ initialize()
1: All con_req messages are accepted beyond this point;
2: Receive received_message_list of the migrating process;
3: insert it to the front of the original received_message_list;
4: Receive "exe and mem state" of the migrating process;
5: Restore process state;
6: inform the scheduler restore_complete;
7: wait for contents of the PL table and old_vmid from the scheduler;
8: inform the scheduler migration_commit;

The initialize() algorithm on the initialized process.

FIG.7

THE PROTOCOL STACK LAYOUT.

A SPACE-TIME DIAGRAM WITH A PROCESS MIGRATION.

A DIAGRAM SHOWING THE BEGINNING OF PROCESS MIGRATION

THE SPACE-TIME DIAGRAM OF A PROCESS MIGRATION.

COMMUNICATION AND PROCESS MIGRATION PROTOCOLS FOR DISTRIBUTED HETEROGENEOUS COMPUTING

This application claims priority from U.S. Provisional Application No. 60/369,025 filed Mar. 29, 2002.

The development of this invention was partially funded by the Government under grant numbers ASC-9720215 and CCR-9972251 awarded by the National Science Foundation. The Government has certain rights in this invention.

BACKGROUND OF THE INVENTION

A virtual machine is a collection of software and hardware to support distributed computations between separate computers. Distributed computing enables users to exploit a network of computer hardware to solve pieces of larger problems at minimal additional cost. A virtual machine has three basic components. First, a network of computers, or workstations, is the basic resource for process execution. Second, a number of daemon processes residing on the workstations to perform the virtual machine functions. A daemon is a program that is not invoked explicitly, but lies dormant waiting for some condition or conditions to occur. The virtual machine daemons work collectively to provide resource access and management. A computer process can access the virtual machine's services via programming interfaces provided in the form of library routines. The third basic component is a scheduler, i.e., a process or a number of processes that control resource utilization within the virtual machine. The scheduler functionalities include bookkeeping and decision-making. Unlike in static distributed environments, such as that supported by PVM and MPI, a scheduler is a necessary component of a dynamic distributed environment such as the Grid environment disclosed by I. Foster and C. Kesselman in *The Grid: Blueprint for a New Computing Infrastructure*, Morgan Kaufmann, 1998.

PVM (Parallel Virtual Machine) is a known software package that permits a heterogeneous collection of Unix and/or NT computers hooked together by a network to be used as a single large parallel computer, but does not allow migration. Thus, large computational problems can be solved more cost effectively by using the aggregate power and memory of many computers. With tens of thousands of users around the world, PVM has become a well known program for distributed computing. MPI (Message Passing Interface) is a well known program environment for process communication in a parallel computing system. MPI provides a library of routines that can be called from Fortran and C programs. MPI's advantages over older message passing libraries is that it is both portable because MPI has been implemented for almost every distributed memory architecture and fast because each implementation is optimized for the hardware it runs on.

Process migration moves a process running on one computer to another computer. A "process" is defined as at least a piece of a computer program which is in operation. Thus the definition of "process" herein necessarily implies at least a portion of a computer running the relevant process.

The term "computer" is defined as those components necessary to accomplish the running of a process, including but not limited to a processor, executable software routines, and memory. Thus, the term "computer" implies a location, or locations, where the process may operate.

One "workstation" may contain one or more computers and may run one or more "processes". Migration, as stated above, will involve the transfer of processing operations from a first computer to a second computer. The person having ordinary skill in the art will understand that in a heterogeneous distributed computing environment, the computers may be, but are not necessarily, physically separated.

The process migration may be available through either a network of similar computers (homogeneous process migration) or over computers with different hardware/software environments (heterogeneous process migration). Motivations for process migration may include, for example, processor load balancing, fault tolerance, data access locality, resource sharing, reconfigurable computing, mobile computing, pervasive computing, system administration and high performance achieved by utilizing unused network resources. Process migration can also be used for portability such as migrating processes from one computing platform to an upgraded one. For example, enabling cellular computing from hand held devices may be especially suited for using process migration.

Process migration is also a fundamental technique needed for the next generation of internet computing. As large-scale distributed applications are becoming more and more popular, it is clear that migration-supported communication protocols may be essential for next-generation network computing. However, despite the need for these advantages, process migration has not been widely adopted due to its design and implementation complexities, especially within a network of heterogeneous computers.

Protocols are algorithms which function mainly to establish orders or rules for interacting processes. Communication protocols are sets of rules that regulate the exchange of messages between computer processes to provide a reliable and orderly flow of information among the communicating processes. Within a virtual machine, where multiple separate, but inter-related, processes may continually need to interact, it is evident that efficient and reliable communication protocols are especially valuable.

Traditionally, data communication between processes running on different computers is conducted with networking protocols such as TCP/IP and ATM. Although these communication protocols are reliable, efficient, and popular point-to-point communication protocols, they do not support process migration. Thus, they may be referred to herein as the "non-migration-supported protocols." Migrating a process under non-migration-supported protocols may lead to message loss from peer computers or within the migrating process. The known art may implement mechanisms with the body of specific computer applications to prevent message loss. However, the application-specific approach lacks modularity and reusability for a virtual machine environment.

There are only a few communication software systems that support process migration in distributed environments. To the inventors' knowledge, the known systems only support process migration in homogeneous distributed systems, i.e., where the computers have the same computing software and hardware. Each of the known systems may also have drawbacks in their practical application to real-world distributed environments including lack of scalability, and lack of modularity of high resource usage.

Detailed descriptions of the known systems may be found in the "related work" section of the document: K. Chanchio and X. H. Sun, "Communication State Transfer for Mobility of Concurrent Heterogeneous Computing," *Proceedings of the 2001 International Conference on Parallel Processing*, September 2001.

Therefore, there is a need in the art for communication and migration protocols which offer improvement of parallel computing performance to achieve efficient resource utilization in a distributed computing environment especially in heterogeneous environments.

SUMMARY OF THE INVENTION

The invention is a new set of data communication and process migration protocols that can work cooperatively to provide correct and efficient data communication and process migration in a distributed computing environment, including a heterogeneous environment. The present invention provides for: point-to-point, process-to-process communication at anytime for sending or receiving data messages, process migration from a first computer to a second computer that may have the same or different computing platform, and data communication while a sender or receiver process migrates.

It is assumed for purposes of explanation that the present invention operates in a virtual machine environment operating a distributed computation as a set of collaborative computer processes executing under a virtual machine environment with the expressed conditions. Each process is a user-level process, which occupies a separate memory space. The processes communicate via message passing. The virtual machine environment is a collection of software and hardware to support the distributed computations having the three basic components described above. The message passing among processes in the application-level follows blocking point-to-point communication in buffered modes, e.g., as based on the MPI standard.

Blocking point-to-point communications assume that if a message content is stored in a memory buffer, a Send operation for a sending process is blocked until the buffer can be reclaimed, and the receive operation for a receiver process is blocked until the transmitted message is stored in the receiver's memory. Exemplary embodiments of the present invention further assume that the underlying virtual machine software creates a bi-directional FIFO (first in first out) communication channel between two computers for data transmission, provides data conversion in case the source and destination computers have different data formats, and provides signaling mechanisms between processes on different computers. These assumptions are quite practical for modern distributed environments. Several software systems such as PVM already have the assumed functionalities available. The protocols of exemplary embodiments are implemented as a thin software layer on top of existing communication software, i.e., each algorithm (protocol) can be implemented as a "single" routine directly on top of the existing communication application program interface (API). The algorithms are not embedded in, or optimized for other operational layers of the virtual machine software.

The simple yet elegant thin-layered designs of the protocols make them well suited to large-scale distributed environments, which may consist of wide varieties of computers and cover multiple kinds of networks. The protocols provide reliable point-to-point data communication for process migration, with relatively small communication overheads. The protocols further provide a scalable mechanism to update location information of a migrating process without interfering with computation or communication activities of other processes in the distributed environment. This property makes the protocols very suitable for large-scale distributed systems. The protocols are implemented in forms of a programming library that are linked to the application program during the compilation to generate an executable. Because the protocols are not embedded, they can be implemented to support distributed computation where processes migrate across heterogeneous computers. The invention is believed to be the only communication and migration protocol system that can effectively support either homogeneous or heterogeneous environments.

The present invention is naturally suitable for large-scale distributed environments since the invention provides that no messages are lost in transit while either a sender or receiver process migrates. The invention further provides that correct message ordering is maintained when either the sender or receiver processes migrate. That is, if messages m1 and m2 are sent consecutively from process A to process B, message m1 will arrive at process B before message m2, regardless of the migration of either process. The invention further allows a sender process to continuously send messages to a receiver process, which may or may not migrate while the message is in transit. The invention further allows any processes in the virtual machine, which want to communicate with the migrating process to update location information of a migrating process in a scalable manner. It is scalable because updates occur only between the migrating process and processes requesting communication with the migrating process, i.e., the communication is only "on demand", or point-to-point, as opposed to a broadcasting method where the migrating process must broadcast its new location information to all other processes on the virtual machine.

The data communication and process migration protocols include a number of algorithms that coordinate point-to-point communication to ensure correct data communications between peer computers for processes that are connected or trying to connect. The communication protocol includes the Send, Connect, and Receive algorithms.

The process migration protocol includes a Migration algorithm and an Initialize algorithm which work in coordination with the Send, Connect, and Receive algorithms to make sure that messages in the communication channels which are in transit during a process migration arrive at the proper destination, i.e., the receiver computer running the process; that connection establishment attempts from any peer processes to the migrating process have been handled appropriately during the migration; that messages being sent to the migrating process are received in the correct order; that message being sent from the migrating process to a non-migrating process are also received in correct order; and that the process is correctly reconstructed on the receiver computer for the receiver process, also sometimes called the "initialized computer" or "initialized process" to which the process has migrated.

In general, the protocols work as follows. After distributed computation has started, users may want to migrate a process from a first computer to second computer, whereupon a migration request is issued to a scheduler, which passes along the request to the process. After receiving the migration request, the process will grant process migration when it is ready. When a migration request is granted for the process in the first computer to migrate to the second computer, the process on the first computer will inform the scheduler it is migrating to the new location and, after getting an acknowledgement from the scheduler, it will not grant further connections to unconnected processes. This is referred to this as the "start" of process migration. At this moment, there are two communication scenarios to consider in the protocol design. In the first case, the protocols have to handle message passing on the existing communication links between the migrating process and a (finite) number of connected peers. In the second case, the protocols have to handle connection requests from an infinite number of unconnected peers.

In the first case, the migrating process then sends out "marker messages" to each connected peer process with which it is in communication indicating it has sent its last message. The connected peer processes acknowledge the migrating process marker message with their own marker message, whereafter the communication link, which is the logical connection via TCP/IP or a like protocol, between the acknowledging peer process and the first process is closed. Note that since messages are transmitted in both directions, between the migrating process and the connected peers in FIFO fashion, all messages that were in transit before the marker messages on both ends are received can be assumed to be received and stored in the receive-message-lists of the processes. Therefore, when the communication link is closed, there are no messages left in transit.

When all communication links between the migrating process on the first computer and a peer process are closed, migration of the process on the first computer start by migrating its state information to the second computer. At this moment concurrent migration operations include operations of the virtual machine and the scheduler verifying that the second computer has an executable copy of the process. Upon verification, the scheduler sends a command through the virtual machine's remote execution functionalities to initialize a new process, i.e., load the executable copy into memory on the second computer, and wait for the state information of the migrating process. In detail, the initialized process may wait for three kinds of messages. They are:

1. Connection request from unconnected processes. The initialized process will accept all connection requests and establish connection with the requester processes.
2. Connection request from the migrating process on the first computer: The initialized process waits to make connection with the migrating process after the migrating process finishes with its internal execution state and memory state gathering and is ready to transmit them over the network to the initialized process.
3. State information of the migrating process. The migrating process transfers its receive-message-list and execution state and memory state over to the initialized process, which restores them to appropriate memory location within process memory space and resume execution.

Then, the scheduler informs the migrating process to establish a communication link and send at least its received-message-list, i.e., the communication state of the process, to the second computer. The migrating process gathers its execution state and memory state on the first computer and sends them to the initialized process on the second computer.

In the second case, as stated, all connection requests from unconnected peer processes for a communications link to the first process are refused during migration operations. An unconnected peer process, upon receiving a refusal to its connection request, will request the new location of the process from the scheduler. Thus, the scheduler is assumed to be known to every process and to have the most updated information of the process location. The scheduler sends the unconnected peer process the location information of the initialized process on the second computer. The unconnected peer process then retries sending the connection request to the initialized process on the second computer. After making a connection, the initialized process receives messages transmitted from a newly connected peer and stores them in order in the received-message-list in its process address space on the second computer. As a result, process location information is updated automatically in each new peer process, which has been informed of the new process location by the scheduler.

The restoration of process state on the second computer is described below. The restoration is performed in the order of communication state, execution state, and memory state. By the time the migrating process on the first computer finishes gathering its execution state and memory state on the first computer, the following states exist on the first and second computers.

1. On the first computer, in the memory space of the migrating process, there is the receive-message-list containing all messages (in FIFO order) from the earlier connected peers at the start of the migration. After the links were closed, all these peers became unconnected peers. Thus the receive-message-list will have a fixed size when all the communication links are closed.
2. On the first computer, in the memory space of the migrating process, there is the execution state and memory state being serialized and ready to be transmitted to the initialized process on the second computer.
3. On the second computer, in the memory space of the initialized process, there is a receive-message-list that contains all messages that are sent from the previously unconnected peer processes before the migration started. Now these peer processes have communication links with the initialized process on the second computer. Thus the receive-message-list can be growing because any unconnected processes can establish a connection at any time with the initialized process.

The information in the receive-message-list of the migrating process and the receive-message-list of the initialized process together is considered to be the communication state of the migrating process.

To reconstruct the communication state, the migrating process on the first computer sends its receive-message-list to the initialized process after the communication link between the migrating process and initialized process is established. Upon receiving the transmitted receive-message-list, the initialized process inserts the list's content in front of its local receive-message-list. As a results the communication state is reconstructed and all messages in the list are in FIFO order.

Then the migrating process sends the execution state and memory state to the initialized process. Exemplary methods contained within the paper "Data Collection And Restoration For Heterogeneous Process Migration" by Kasidit Chanchio and Xian-He Sun published in *Software Practice and Experiences*, 25 Jul. 25, 2002, Volume 32, Number 9, pages 845–871; and U.S. Pat. No. 6,442,663 entitled "Data Collection and Restoration for Homogeneous and Heterogeneous Process Migration", issued 27 Aug. 2002 to the present inventors, describe presently preferred methods of how to reconstruct the execution state and the memory state of a process on the second computer, respectively. After the reconstruction of both states, the initialized process resumes normal distributed computation. At this point it is no longer the initialized process, but is now a distributed process in normal execution operation. This point is referred to as the "end" of process migration.

BRIEF DESCRIPTION OF THE DRAWINGS

FIG. 3 is a representation of a Send algorithm of the communications protocol according to certain aspects of the present invention.

FIG. 4 is a representation of a Connect algorithm of the communications protocol according to certain aspects of the present invention.

FIG. 5 is a representation of a Receive algorithm of the communications protocol according to certain aspects of the present invention.

FIG. 6 is a representation of a Migration algorithm of the process migration protocol according to certain aspects of the present invention.

FIG. 7 is a representation of an Initialization algorithm of the process migration protocol according to certain aspects of the present invention.

DETAILED DESCRIPTION OF THE PRESENTLY PREFERRED EMBODIMENTS

Figure 1:
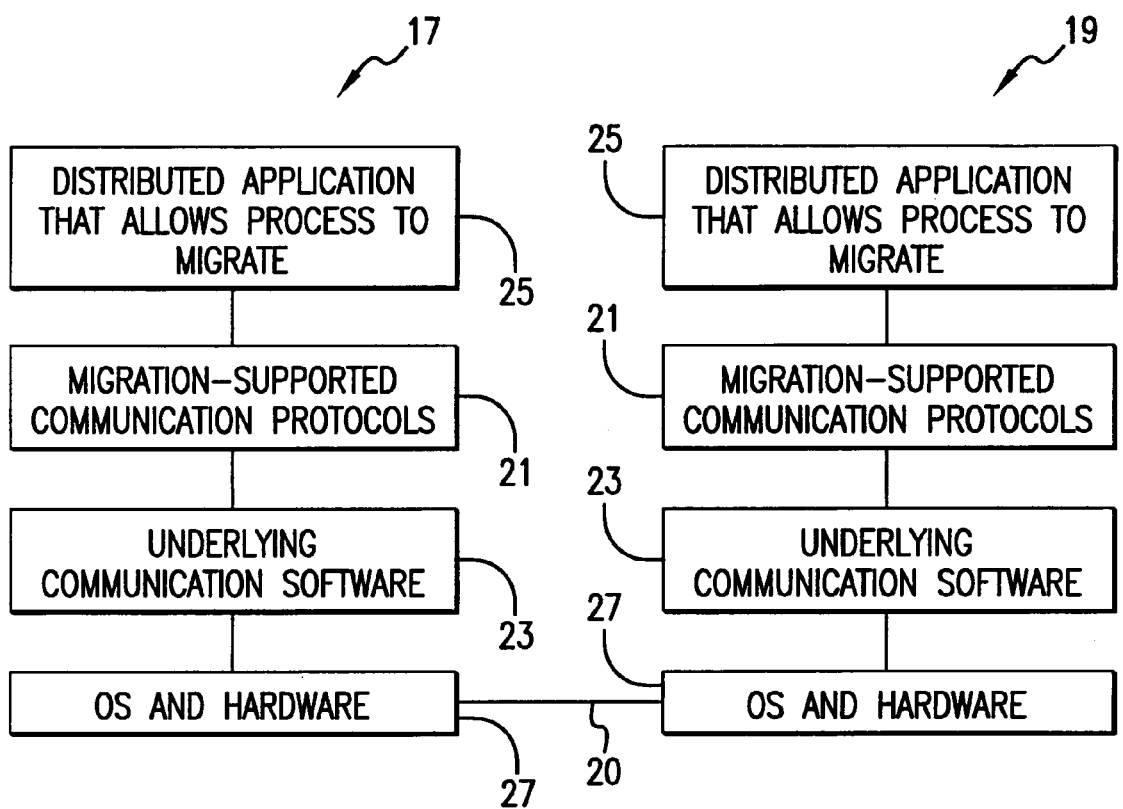
FIG. 1 is a schematic representation of the software and hardware layers of a virtual machine according to certain aspects of the present invention.

FIG. 1 illustrates the layout of protocol construction in a distributed environment of the present invention, between a sender computer 17 and a receiver computer 19 with a communication link 20 between them. The communication and migration protocols 21 of the present invention are thin software layers not embedded in the standard non-migration supported point-to-point protocols 23 which the communication and migration protocols 21 overlay. The communication and migration protocols 21 are further independent from the distributed application software 25 which they support. At the bottom layer 27 of each sender and receiver process running, or initialized to run, on the sender computer 17 and receiver computer 19; is the operating system (OS) and hardware 27 of the respective computers. A major focus of the communication and migration protocols is to handle correct data communication in a migration-supported environment. The non-embedded layer 21 allows for heterogeneous computing with low overhead and easy distribution.

Figure 2:
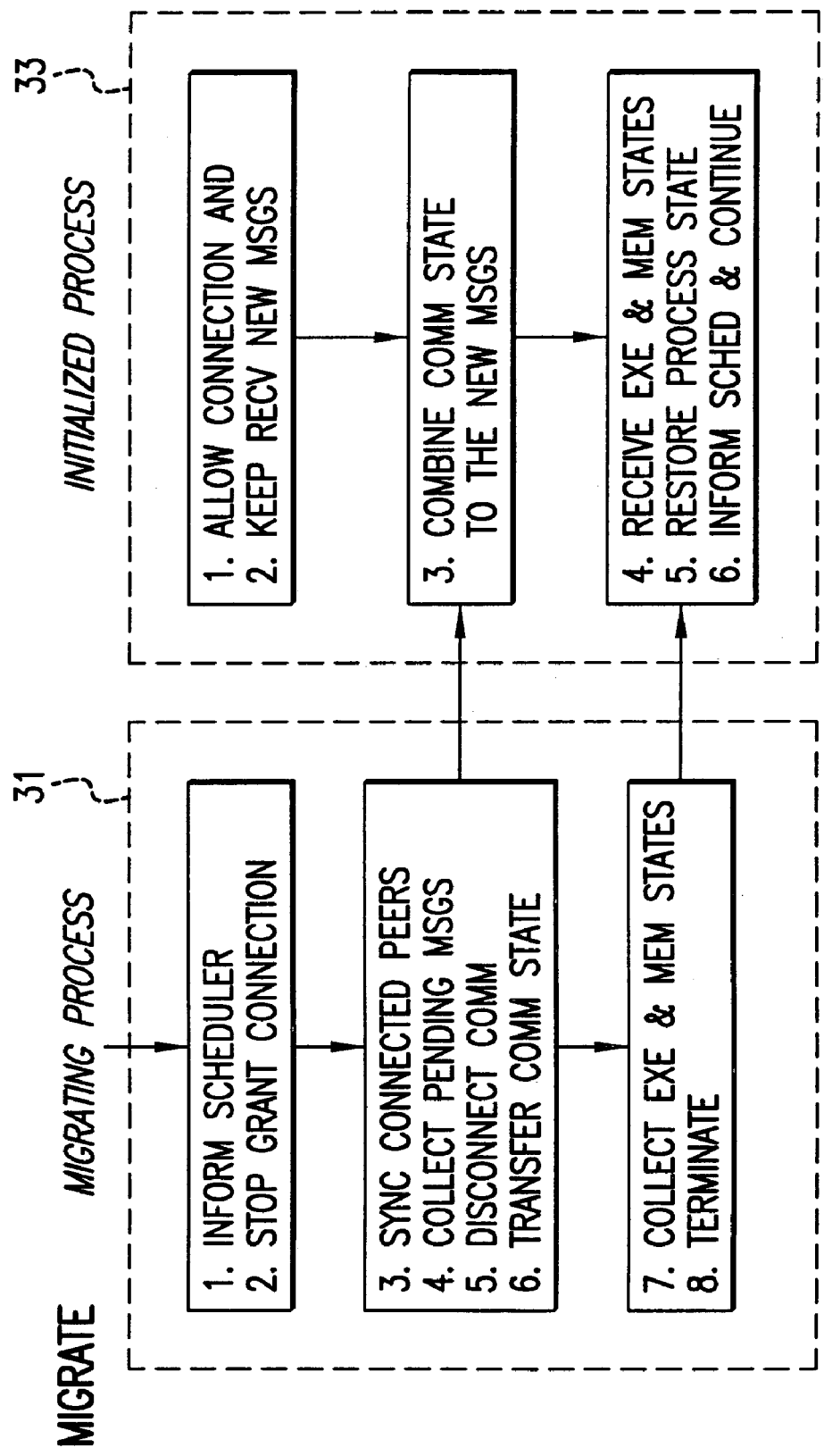
FIG. 2 is a schematic representation of the migration process between two computers of a virtual machine according to certain aspects of the present invention.

In FIG. 2, a software schematic is seen representing aspects of the present invention for controlling message traffic during migration of a process from its migrating state on a first computer 31 to its new initialized state on the second computer 33, including migration of the execution state, memory state and communication state of the process; within the distributed computing virtual machine. As further discussed below, the virtual machine will include a scheduler and peer computers or processes (not shown) in addition to the first computer and the second computer, and a network between computers. The network consists of physical communication links and communication software that control data transmission.

In the present example, the communication software comprises a connection-oriented protocol such as TCP/IP to transmit binary stream of data and communication protocol layers such as PVM or MPI. As a result, a logical communication connection has to be established at the connection-oriented protocol layer before any data transmission can occur. A process makes a logical connection by sending a connection request to the desired receiver process. The connection is established after the receiver process accepts and acknowledges the connection request. Two processes that have established communication links to one another may be referred as "connected peers" or "connected peer processes" or "connected processes" or "communicating process." On the other hand, we refer to the processes that do not have such communication links are referred to as "unconnected peers" or "unconnected peer processes". Since the connection is made between processes, multiple such connections can occur between two workstations if either of the workstations has more than one process.

As mentioned earlier, a distributed application consists of processes running on computers in the virtual machine. Each process has separate memory space. Further all processes are allotted a received-message-list memory location in which messages that have been received from the network are stored.

The data communication and process migration protocols include a number of algorithms that coordinate point-to-point communication to ensure of correct data communication. The communication protocol includes the Send, Connect, and Receive algorithms, as set forth in FIGS. 3–5 respectively.

The Send algorithm of FIG. 3 provides connection establishment mechanisms. It provides that a sender computer connection is established with a receiver computer before messages are exchanged, so that messages are received whether the receiver process is migrating to a new computer or not.

The Connect algorithm of FIG. 4 manages connection requests, denials and rerouting requests between sender and receiver processes. As stated, the rerouting of the connection request occurs after the denial from a receiver process has been received by the sender process, whether due to the receiver's migration or refusal from the virtual machine in case the receiver process has already finished its migration. The connect algorithm shows that the sender process consults the scheduler after the denial occurs.

The Receive algorithm of FIG. 5 includes mechanisms to direct messages between the proper sender and receiver processes, whether peer processes or migration pair, even though either the sender or the receiver processes may migrate. "Sender" and "receiver" may also refer to peer processes wishing to send or receive messages within the virtual machine. The Receive algorithm helps manage communication link maintenance or cancellation and routing of messages in the correct order to each computer's received-message-list for a particular process.

Finally, the process migration protocol and its Migration algorithm of FIG. 6 and Initialize algorithm of FIG. 7 work in coordination with the Send, Connect, and Receive algorithms to make sure that messages in the communication channels which are in transit during a process migration arrive at the proper destination computer running the process; connection establishment attempts from any peer processes to the migrating process have been handled appropriately during the migration; messages being sent to the migrating process are received in the correct order; and that the process is correctly reconstructed on the computer to which it has migrated.

Processes in the distributed computing environment are identified in two levels of abstraction: application-level and virtual-machine-level. In the application-level, a process is identified by a rank number, a non-negative integer assigned in sequence to every process in a distributed computation. The rank number indexing can generally be replaced by any sortable naming scheme. The rank number allows references to be made to a process transparently to its whereabouts. On the other hand, the virtual machine level includes location information of a process in its naming scheme. A virtual-machine-level-identification (vmid) is a coupling of workstation and process identification numbers. Both numbers are non-negative integers assigned sequentially to workstations and processes created on each workstation, respectively. The mappings between rank and vmid are maintained in a process location (PL) table, where the PL table is stored inside the memory spaces of every process and the scheduler of the virtual machine. While the rank numbers are given only to application-level processes, the vmid is assigned to every process in the virtual machine including the scheduler and virtual machine daemons. It is assumed that both the scheduler and the daemon do not migrate.

The migration-supported executables are assumed to be distributed on potential destination computers prior to process migration. With supervision of the scheduler, a process migration is conducted directly via remote invocation and network data transfers. When a user, or a computer in the virtual machine, wants to migrate a process, it sends a request to the scheduler, which, in turn, decides the destination computer for the migrating process and remotely invokes the migration-supported executable to wait for process state transfer. This invocation is named "process initialization". Thus, there is a migrating computer and an initialized computer as the sender and receiver of the migrating process. Upon process initialization, the scheduler sends a migrating signal to the migrating process. This corresponds to the "start" of process migration on the migrating process. After the signal is received, the migrating process coordinates the initialized process to transfer the state information of the process. Finally, while the migrating process terminates, execution on the initialized process resumes.

Message passing among processes in the application-level should follow blocking point-to-point communication in buffered modes. Assuming a message content is stored in a memory buffer, the Send operation blocks until the buffer can be reclaimed, and the receive operation blocks until the transmitted message is stored in the receiver's memory. The sender processes do not coordinate with the receiver for data transmission. Once the message is copied into the internal buffers of an underlying communication protocol, i.e., the receive message list, the sender process can continue.

While the exemplary embodiments are set up to follow the blocking point-to-point underlying protocols such as MPI, a person having ordinary skill in the art of distributed computation will appreciate that extension mechanisms for making the exemplary embodiments cover the non-blocking case are possible without departing from the spirit of the present invention.

For example, one possible method to support non-blocking communication, may be to construct an internal buffer to store outgoing messages; define the post-send, complete-send, post-receive, and complete-receive operations as described in the MPI standard. This method can be implemented as another layer of communication protocols on top of the disclosed invention. In a multi-threading scenario, one may have an application process running one thread of computation and invoke the non-blocking communications, while another thread operates the communication mechanisms as discussed in this disclosure.

Figure 8:
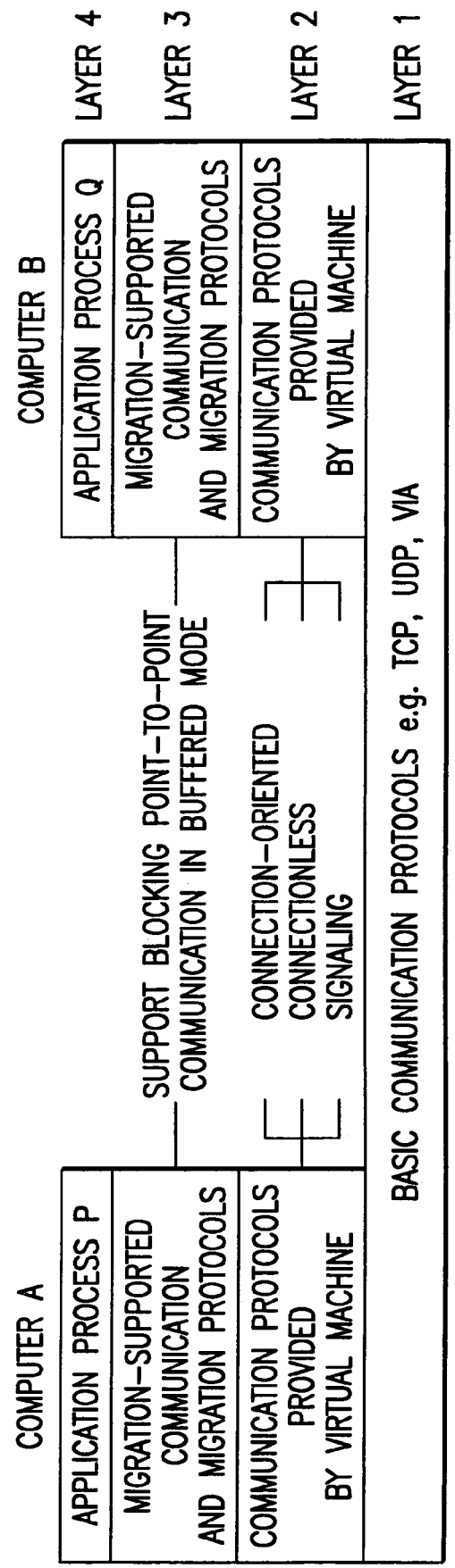
FIG. 8 is a schematic representation of the protocol stacks according to certain aspects of the present invention.

FIG. 8 shows the protocol stack layout of a communication system for the process migration environment. The first, lowest, layer is the operating system-supported data communication protocols between computers. The second layer operating system contains communication protocols provided by the virtual machine built on top of the first communication layer. The virtual machine provides three basic communication services. They are connection-oriented communication utilities, the connectionless communication utilities, and signaling across computers in a distributed environment. It is assumed the connection-oriented communication creates a bi-directional FIFO communication channel between two computers. In case messages are sent between computers with different platforms, it is also assumed that the protocol in this layer will handle data conversion.

The third layer contains the migration-supported data communication and process migration protocols which are discussed in the next section in more detail. The protocols in the third layer provide primitives for the fourth layer, the application-level process layer.

This section presents basic ideas of mechanisms to migrate the communication state and algorithms for performing data communication and process migration operations. Since the data communication at the application-level is performed on top of the connection-oriented communication protocol, the communication state of a process is defined to include all communication connections and messages in transit at any moment in the process's execution. To migrate the communication state, one has to capture the state information, transfer it to the receiving, or initialized, computer, and restore it successfully.

Migrating a communication state is non-trivial since various communication situations can occur during process migration. Three basic circumstances are considered herein.

In the first case, to capture messages in transit, processes on both ends of a communication channel have to coordinate with each other to receive the messages until none is left. The coordination mechanism will be discussed later with respect to the Migration algorithm. As a result of the coordination, messages in transit are drained from the channels and stored in temporary storage in a process memory space, namely the received-message-list. Consequently, the use of received-message-lists effects the design of receive options. Since messages could be stored in a received-message-list before needed, the receive operation has to search for a wanted message from the list before taking a new message from a communication channel. In case the new messages are not wanted, they will be appended to the list until the wanted message is found.

After messages in transit are captured and existing communication connections are closed down, one may consider the messages stored in the received-message-list of the migrating process as a part of the process's communication state which has to be transferred to the initialized computer.

To handle data communication between presently unconnected processes, the connection establishment mechanisms have to be able to detect migration activities of the processes and automatically resolve any connection problem. Since the message passing operations only employ Send and Receive primitives and do not support explicit commands for connection establishment, the establishment mechanisms are installed inside the Send and Receive operations hidden from the application process. To establish connections, "the sender-identified" technique is employed where the sender sends a connection request to its intended receiver process.

To support migration, the connection establishment mechanisms must be able to detect the migration, or a past occurrence of the migration, and inform the sender process. In the present design, the migration is detected once the sender receives a denial to its connection request. The rejection message could come either from the virtual machine or the migrating process. The virtual machine sends a rejection message in case the migrating process has already been migrated. On the other hand, the migrating process rejects connection during migration operations. The migrating process starts migration operations when it receives a migration instruction from the scheduler and finishes the operations when the process state transfer is complete. During that time, if connection requests were intercepted, they would be responded to with denials.

Once the migration is detected, i.e., a rejection message is received, the sender consults the scheduler to locate the receiver, e.g., the initialized process. After getting a new location, the sender updates the receiver's location, establishes a connection, and sends messages. Based on this scheme, a sender is not blocked while sending messages to a migrating process. The updating of the receiver's location is also performed "on demand" in the PL table maintained inside the sender's memory space. Thus, the location updating is scalable.

The scheme for restoring a communication state on a new process can be addressed in two parts. First, contents of the received-message-list forwarded from the migrating process are inserted to the front of the received-message-list of the new computer. This scheme restores the messages which are captured in transit during the migration. Second, messages sent from a newly connected process, i.e. after migration, to the new computer are appended to the end of the list. This scheme ensures correct message ordering.

Based on the previously mentioned designs, algorithms are implemented. The communication algorithms comprise Connect, Send, and Receive algorithms which take care of the connection establishment and the received-message-list, while the process migration algorithms consists of two algorithms which run concurrently on the migrating and initialized processes to carry process migration. The algorithms use the following global variables. "Connected" is a set of rank numbers of connected peer processes. An identification number of a peer process is added to the "connected" set of any sender process after the connection between the sender process and the receiver process is established, e.g., line 5 of FIG. 4. An array PL represents the process location table. The vmid process, Pi, is stored in PL[i].

The Send and Connect algorithms initiate data communication between processes by sending a request for connection establishment from the sender computer to the receiver. In case the receiver cannot be found due to a process migration, the Send algorithm will consult the scheduler, a process which manages process allocation in the environment, to locate the receiver. Once the receiver's location is known, the sender establishes a connection and sends messages to the receiver process. FIG. 2 shows the Send algorithm where a communication connection request "conn_req" is sent to a receiver process. If the receiver process is migrating, it will reject the request and send "conn_nack" back. Then, the sender will consult the scheduler as mentioned earlier.

The Receive algorithm, as shown in FIG. 4, is designed to collect messages in an orderly manner in a process migration environment. The algorithm stores every message which has arrived at a process in the received-message-list in the receiver's memory space.

The Receive algorithm also has functionalities to help migrating its peer processes. In the case where a process is running a receiving event while one of its connected peer processes migrates, the receive event may receive a control message from the migrating connected peer process. The "peer_migrating" control message is a special marker message sent from a migrating peer. The message indicates the last message sent from the peer and instructs the closure of communication channel between the connected processes. The reception of this message implies all the messages sent from the connected peer migrating process have already been received by the receiving process.

The process migration protocol involves algorithms to transfer process states across computers. They are the Migration and Initialization algorithms as shown in FIGS. 5 and 6, respectively.

On the migrating process, the Migration algorithm first checks whether a "migration_request" signal has been sent from the scheduler and is received by the migrating process. If so, the migrating process contacts the scheduler to get information of an initialized process on a receiving computer. Then, the algorithm rejects further communication connection so that it can coordinate with existing communication peers to receive messages in transit and place them into the received-message-list. At lines 2 and 3 of FIG. 3, the migrating process lets the scheduler initialize a process on the receiving computer to wait for process state transfer before rejecting further connection requests ("conn_req"). In rejecting the requests, "conn_nack" is received, causing sender processes to consult the scheduler, receive the new location of, and redirect their requests to, the initialized process. Therefore, before the connection rejection message is sent, the initialized process must already exist and the scheduler has to know its information.

In a migration-process coordination, the migrating process sends a disconnection signal and "peer_migrating" control messages out to all of its connected peers. The "disconnection" signal will invoke an interrupt handler on the peer process if the peer is running computation operations. The interrupt handler keeps receiving messages from the communication connection until the "peer_migrating" message is found and then closes the connection. In case the peer process is running a receive event, the Receive algorithm may detect "peer_migrating" while waiting for a data message. The peer process then will close down the communication connection by the Receive algorithm (see statement 12 of FIG. 4).

The last message from a closing peer connection is the "end-of-message" marker message. The migrating process places messages from all connected peers into its received-message-list until all the marker messages are received. The migrating process then closes the existing peer connections and collects the execution state and memory state of the process. Then, the migrating process sends the content of the received-message-list as well as the execution and memory state information, to the destination computer. Note that, for heterogeneity, the execution and memory state transfers may be based on the techniques presented in previous works by the inventors presented in K Chanchio and X.-H. Sun, "MpPVM: A Software System For Non-Dedicated Heterogeneous Computing", *Proceedings of 1996 International Conference on Parallel Processing*, August 1996; and K Chanchio and X.-H. Sun, "Memory Space Representation For Heterogeneous Networked Process Migration", *12th International Parallel Processing Symposium*, March 1998; and U.S. Pat. No. 6,442,663, entitled "Data Collection and Restoration for Homogeneous and Heterogeneous Process Migration", issued 27 Aug. 2002 to the present inventors; and the XDR encoding/decoding operations performed during data transmission. More information about XDR operations can be found in Corbin, *"The Art of Distributed Applications"*, Springer; Berlin, 1990.

On the destination computer, a new process is initialized to wait for the process state transfer. FIG. 6 shows the Initialization algorithm. The initialized process will accept any connection requests from "start". At line 2 of FIG. 6, the algorithm waits for the contents of the received-message-list from the migrating process. During the wait, if any "conn_req's" arrive, the initialized process will grant connection establishment. If a wanted message does not arrive, the initialized process will receive all new messages and append them to its local received-message-list. It should be noted that while connections are granted on the initialized process, they are rejected on the migrating process. Based on the Send algorithm, the rejection will cause connection requests to be redirected to the initialized process. After the operation at line 2 succeeds, the received-message-list contents are inserted to the front of the local received-message-list to maintain message ordering. Then, the Initialization algorithm waits for the execution and memory state of the migrating process. If any messages or "conn_req's" arrive during the wait, they are responded to with operations such as those in line 2. The Initialization algorithm restores the process state after receiving the state information from the migrating process. Then, the Initialization algorithm informs the scheduler of migration completion, updates the PL table, and finally resumes program execution.

The algorithms can be implemented in a thin-layered protocol on top of, e.g., an extended PVM system, with the Send algorithm implemented on top of the pvm_send routine to make sure of reliable connection establishment and the Receive algorithm running on top of $pvm_{13}$ recv to make sure of reliable message arrivals. The process migration algorithms are then also implemented.

In prototypes, the virtual machine and scheduler were employed to monitor and manage the runtime environment. A PVM virtual machine was used to handle process creation and termination and pass control messages and signals between computers. A simple scheduler is implemented to oversee process migration. In the prototype implementation, the scheduler does not support any advanced allocation policy but only provides basic bookkeeping for process migration records.

EXAMPLE

To test the proposed data communication and process migration protocols, software prototypes were implemented and experiments performed on a communication intensive, parallel kernel, MG benchmark program. The prototypes consist of a software library for the protocol implementation and its supportive runtime system. As shown in FIG. 7, the protocol stack has four layers. For the virtual machine layer, a modified PVM communication library accommodates the protocol. PVM has two communication modes. One is direct communication implemented on top of TCP/IP, the other is indirect communication where messages are routed via PVM daemons. The PVM direct communication is extended for the present message passing protocol. The indirect mode is used only for sending control messages. The direct communication establishes TCP connection "on demand" when a pair of "pvm_send" and "pvm_recv" or a pair of "pvm_send" messages are invoked by the process on both ends.

As shown in FIG. 8, TCP lies in the lowest layer of the protocol stack and has an extended PVM communication library implemented on top. In the second layer, the "pvm_send" routine is modified to consult the scheduler when it tries to establish a communication channel with a process that has migrated. A number of connectivity service routines are also added to provide utilities for higher-level protocols to request, grant, destroy, and make status reports of every communication channel a process has. The extension causes only small changes to the PVM source as most of the present inventions protocol designs are implemented in next layer of the protocol stack.

The data communication and process migration protocols are implemented in the third layer. Although the Send algorithm has most of its operation performed in the extension to the "pvm_send", operations to access and update the PL table are implemented in this layer. The Receive algorithm runs on top of "pvm_recv" and maintains the received-message-list here. The Migration algorithm uses the extended connectivity service routines to coordinate peer processes and disconnect existing communication channels. The Initialization algorithm cooperates with the Migration algorithm and restores the process state. Another important programming library in this layer (not shown in FIG. 7) contains utilities to collect and restore the execution state and memory state of a process and also handles state transfers directly via TCP. For modularity, such utilities can be implemented separately from the protocols proposed here. Finally, the migration-enabled process stays in the forth layer.

As a case study, the application of the prototype implementations are shown on a parallel kernel MG benchmark program as set forth in: S. White, A. Alund, and V. S. Sunderam, "Performance of the NAS Parallel Benchmarks on PVM based Networks", *Tech. Rep. RNR*-94–008, Emory University, Department of Mathematics and Computer Science, May 1994. The benchmark is written in C and originally runs under a PVM environment. The kernel MG program is an SPMD-style program executing four iterations of the V-cycle multigrid algorithm to obtain an approximate solution to a discrete Poisson problem with periodic boundary conditions on a 128×128×128 grid.

The kernel MG program applies block partitioning to the vectors for each process. A vector is assigned to an array of size 16×128×128 when 8 processes are used. Since each process has to access data belonging to its neighbors, the data must be distributed to the process which needs them. Such distribution occurs periodically during execution. Every MG process transmits data to its left and right neighbors. Therefore, the communication is a ring topology. Data communication of the MG program is nontrivial because the application exercises extensive interprocess communication; over 48 Mbytes of data on the total of 1472 message transmissions.

The program is annotated with process migration operations and the communication and migration protocols are linked with the annotated program. In experimental settings, eight processes were generated ranking from process 0 to 7. Each process stays on a different workstation. Then, process 0 is forced to migrate when a function call sequence "main→kernelMG" is made and two iterations of the multigrid solver inside the kernelMG function are performed. For reliable data communication, the PVM send and receive routines in source code are changed to those of the present invention's communication library. As a result, while process 0 migrates, other processes would be executing without a prior knowledge of the migration incident. Note that no barrier is used to synchronize the processes during a migration.

Figure 9:
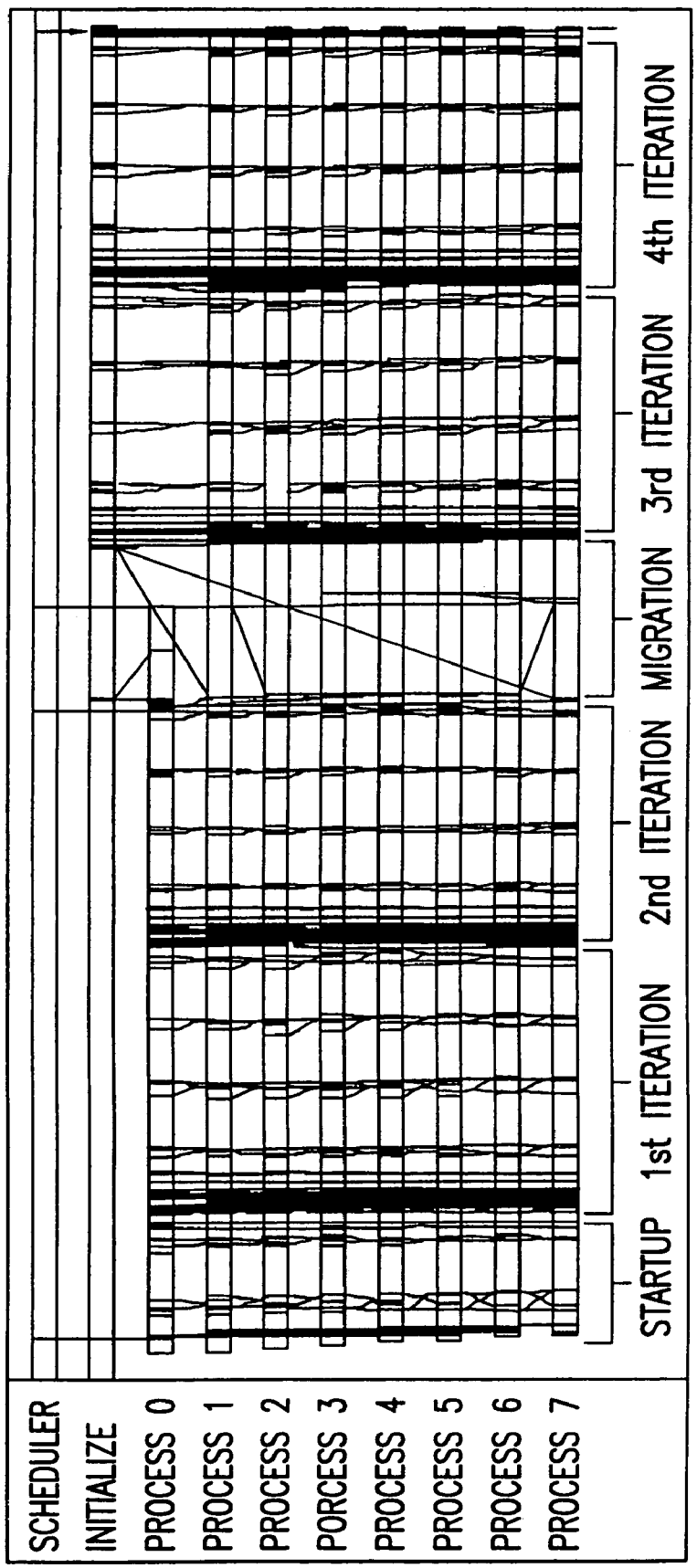
FIG. 9 is a space-time diagram illustrating certain performance aspects of a prototype embodiment of the present invention.

Experiments were conducted to study process migration of the kernel MG program. In the first experiment, communication behaviors are analyzed during a process migration. FIG. 9 shows a XPVM generated migration diagram of the kernel MG program running on a cluster of ten Sun Ultra 5 workstations connected via 100 Mbit/s Ethernet. Two work stations were set up to run the scheduler and an initialized process. Process 0 spawns seven other processes on different work stations as shown in FIG. 9. Note that a line between two timelines indicates a message passing which starts at the point where "pvm_send" is called and ends when the matching "pvm_recv" returns. Since the communication routines of the present invention are implemented on top of PVM, these lines also show what is going on inside the prototype implementation. Also, since the execution and memory state transfer is implemented directly on TCP, their network transmissions are not displayed in this diagram. In the Fig., the execution is separated into different stages. The kernel MG program consists of a number of "pvmmg" processes, an executable linked to PVM communication library and linked to our invention, being distributed to computers in the virtual machine. When distributed computation starts these pvmmg executables are invoked and run concurrently. First, all pvmmg processes establish connections, distribute data, and perform the first two iterations. Then, the migration is performed by relocating process 0 to the initialized process. After the migration, the kernel MG resumes the rest of its computation.

Figure 10:
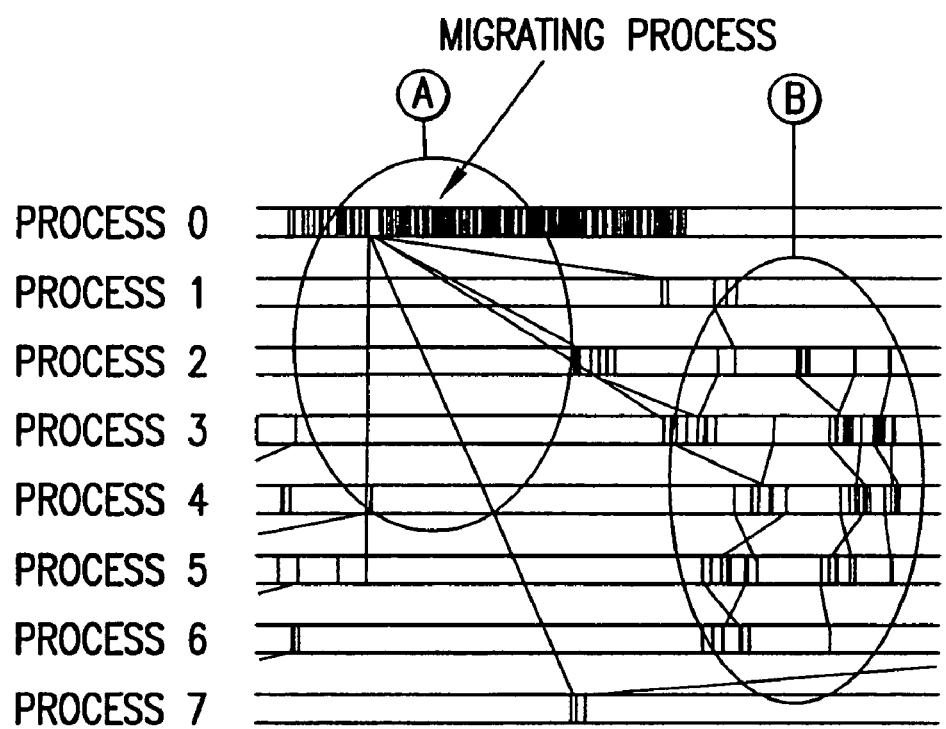
FIG. 10 is a space-time diagram illustrating certain performance aspects of a prototype embodiment of the present invention.
Figure 11:
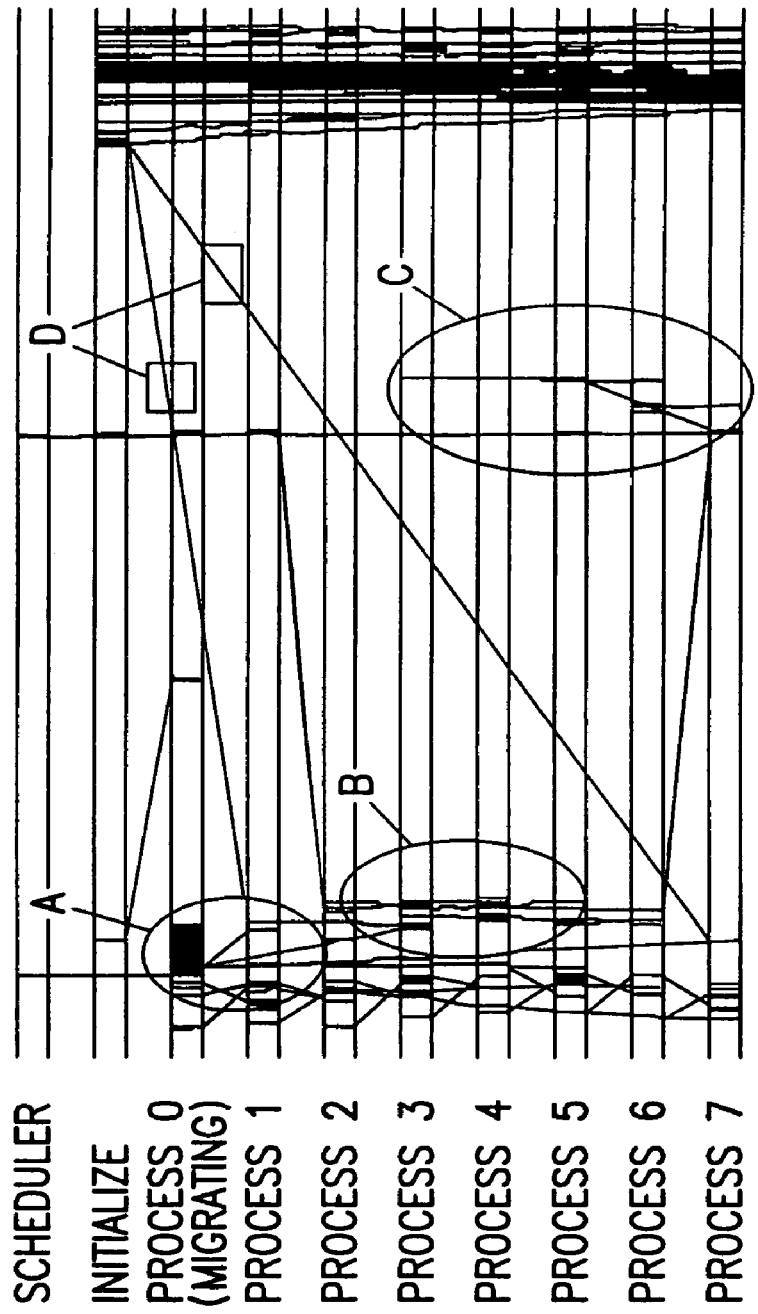
FIG. 11 is a space-time diagram illustrating certain performance aspects of a prototype embodiment of the present invention.

A number of interesting facts are observed through the space-time diagram. First, since the migrating process has connection to all other processes (due to the original setup of the benchmark), it has to send disconnection signals and "peer_migrating" messages to them. When the migration starts, there is no message sent to time migrating process from any of the connected peers. Therefore, the migrating process does not receive any messages into the received-message-list when it performs message coordination with connected peers. After the coordination, every existing connection is closed. This operation is shown in area A in FIG. 10. Ten experiments were performed under the same testing configuration and found the timing results to be very similar. There was no forwarding message in the tests. The communication pattern during the migration also does not exhibit any variation. Second, while process 0 migrates, other processes proceed with their data exchanges normally. As long as a process does not have to wait for messages, its execution continues. Area B in FIG. 10 shows such execution. In normal operation, the kernel MG process would exchange messages of size 34848 followed by 9248 and 2592, etc., with its near neighbors. In area B, some non-migrating processes proceed with the exchanges up to the message size 2592. Then, they have to wait for certain communications to finish before proceeding further until only process 4 can transmit messages of size 800 to its neighbors (area C in FIG. 11). Beyond this point, the non-migrating processes have to wait for process 0 to start sending data after the migration finishes.

Finally, following the multigrid algorithm, two messages of size 34848 bytes are sent from process 1 and 7 to process 0 at the start of the third iteration. Since the process 0 is migrating amid the communication channels between process 0 and 1 and those between 0 and 7 are already closed, both senders have to consult the scheduler to acquire the location of the initialized process for establishing new communications. Such communications are shown by the two lines captured by label D in FIG. 11. Upon a closer analysis of trace data, it was found that the communication channels are established before the execution and memory state restoration of the migrating process, allowing the senders (processes 1 and 7) to send their data to the initialized process in parallel to the execution and memory state restoration. Since the sent data are copied to low level OS buffers, the sender processes can proceed with their next execution so that the computation can continue in the area C. The sent data are received after the restoration finishes, resulting in XPVM displaying two long lines cut across the migration time frame as shown in area D in FIG. 11. After that, the migrating process starts resuming its execution, sends two messages of size 34848 bytes back to its neighboring peers, and continues the multigrid computation. These observations confirm that the prototype represents general communication situations and validates the proposed communication protocols.

The overhead of the present communication and migration protocols and the cost of migration were also examined. Table 1 shows the measured turnaround time of the parallel MG benchmark. All timing reported is averages of ten measurements. "Original" represents the original code runtime on PVM; "modified" is the migration-enabled process running without a migration. Finally, "migration" represents the migration-enabled process running with a migration.

TABLE 1

| Total | original | modified | migration |
| --- | --- | --- | --- |
| Execution time | 16.130 | 16.379 | 18.833 |
| Communication | 4.051 | 4.205 | 6.647 |

By comparing the communication time of "modified" and that of "original", the overhead is evidently small. Although over 48 Mbytes of data on the total of 1472 messages are transmitted during execution, the total overhead of the modified code is only about 0.144 seconds. It is believed that such small overhead is due to the thin layer protocol design on top of PVM.

By comparing the execution time of the migration to that of the original code, it is found that a migration incurs about 2.2922 seconds higher turnaround time. Although processes can continue execution while the process 0 migrates, due to the communication characteristic of the kernel MG program, they eventually all have to wait for messages from the process 0 after its migration. The waiting contributes to the migration cost. The migration transmits over 7.5 Mbytes of execution and memory state data. In detail, it is found that migration cost is 2.2922 seconds in average, which can be divided into 0.1166 seconds for communication coordination with connected peers, 0.73 seconds for collecting the execution and memory state of the migrating process, 0.7632 seconds to transmit the state to a new work station, and 0.6794 seconds for restoring them before resuming execution While certain exemplary embodiments have been put forth to illustrate the present invention, these embodiments are not to be taken as limiting to the spirit or scope of the present invention which is defined by the appended claims.

We claim:

1. Computer-readable media or memory having software embodied therein for controlling message traffic and migration of a process, the process including an execution state, a memory state and a communication state;
from a first computer to a second computer in a distributed computing virtual machine, the virtual machine including a scheduler, peer processes in addition to the process intended for migration, and communication links between processes, comprising:
   a) communications protocols and process migration protocols allowing point-to-point communication between processes; and
   b) the software being an independent layer over standard communication protocols and operating systems of the virtual machine; and wherein;
   c) all processes are allotted a received-message-list memory location in which messages for their processes can be stored;
   d) when a migration request is granted for the process in the first computer to migrate to the second computer the process in the first computer becomes a migrating process, the migrating process then sends out marker messages to each connected peer process with which it is in communication indicating the migrating process has sent its last message;
   e) the connected peer processes acknowledge the migrating process marker message with their own marker message, where after the communication link between the acknowledging connected peer processes and the migrating process is closed;
   f) when all connected peer process communication links with the migrating process are closed, migration operations begin to transfer the migrating process from the first computer to the second computer;
   g) migration operations include the virtual machine verifying that the second computer has an initialized process as an executable copy of the migrating process, whereupon the migrating process sends at least its received-message-list as the communication state of the process to the initialized process, and the execution state and memory state of the migrating process are gathered from the migrating process and sent to the second computer for use by the initialized process;
   h) peer process connection requests for a communications link to the migrating process are refused during migration operations, a peer process upon receiving a refusal to its connection request will request a new location of the initialized process at the second computer, whereby all message traffic during migration is routed to the initialized process in the second computer and stored in order of receipt in the received-message-list of the initialized process;
   i) all process execution, memory, and communication states are restored in the second computer to create a migrated process; and
   j) migrated process location information is undated in each peer process which has been informed of the migrated process location;
   k) wherein the migrating process is identified by a non-negative integer rank number at the application level;
   l) wherein the migrating process is identified by a rank number and computer location at the virtual machine level; and
   m) wherein the migration operations include the virtual machine loading an executable copy of the process programming on the second computer.

2. The computer-readable media or memory having software embodied therein according to claim 1 wherein the communication links include a connection-oriented communication protocol that delivers messages in FIFO fashion between processes.

3. the computer-readable media or memory having software embodied therein according to claim 1, further comprising:
   a) the communication protocols having algorithms including:
      i) a Connect algorithm for managing connection requests, denials and rerouting requests between sender and receiver computers,
      ii) a Send algorithm for allowing a sender computer to send messages to a receiver computer by verifying that a sender computer connection is established with a receiver computer process before messages are exchanged, and
      iii) a Receive algorithm for managing transfer of messages between peer processes whether said processes have migrated or not; managing communication link maintenance or cancellation, and storing of messages in the correct order in a received-message-list of a particular process; and
   b) the process migration protocol having algorithms including:
      i) a Migration algorithm for managing acceptance of communications link between processes during migration operations, and
      ii) an Initialization algorithm for restoring the migrating process as necessary to restart the migrating process at the second computer.

4. the computer-readable media or memory having software embodied therein according to claim 3 wherein the Send algorithm is coded as:
send (in, dest)
   1: if (dest >Connected) then
   2: cc[dest]=connect (dest);
   3: end if
   4: send m along the cc[dest]communication channel.

5. The computer-readable media or memory having software embodied therein according to claim 3 wherein the Connect algorithm is coded as:
connect (dest)
   1: while (dest>Connected) do
   2: send conn_req to pl[dest];
   3: if (receive conn_ack from pl[dest]);
   4: cid:=make_connection_with (pl[dest]);
   5: Connected:={dest}U Connected
   6: else if (receive conn_req from any process p) then
   7: grant-connection_to(p);
   8: else if (receive conn_nack from pl[dest]) then
   9: consult scheduler for exe status and new.vmid of $P_{dest}$
   10: if (status=migrate) then
   11: pl[dest]:=new.vmid;
   12: else report "error; destination terminated";
   13: return error; end if
   14: end if; end if; end while;
   17: return cid.

6. The computer-readable media or memory having software embodied therein according to claim 3 wherein the Receive algorithm is coded as:
recv (src, m, tag)
   1: While (m is not found) do
   2: if (m is found in received_message_list) then 3: return m, delete it from the list, and return to a caller function;
4: end if
5: get a new data or control message, n;
6: if (n is data message) then
7: append n to received_message_list;
8: else (handle control messages)
9: if n is con_req then
10: grant_connection to(sender of n);
11: else if n is peer_migrating then
12: close down the connection with the sender of peer_migrating;
13: end if; end while.

7. The computer-readable media or memory having software embodied therein according to claim 3 wherein the Migration algorithm is coded as:
migrate()
1: if (migrate_request is received) then
2: inform the scheduler migration_start
3: get new.vmid of $P_1$ from scheduler;
4: All con-req arrived beyond this point will be rejected;
5: Send disconnection signal and peer-migrating
6: Receive incoming messages to received-message-list until getting end-of-messages
7: close all existing connections;
8: Send received-message-list to the new process;
9: perform exe and memory state collection;
10: Send the exe and memory state to the new process;
11: wait for migration_commit msg from scheduler;
12: cooperate with the virtual machine daemon to make sure that no more con_req control message left to reject;
13: terminate;
14: end if.

8. The computer-readable media or memory having software embodied therein according to claim 3 wherein the Initialization algorithm is coded as:
initialize()
1: All con_req messages are accepted beyond this point;
2: Receive received-message-list of the migrating process;
3: insert received-message-list to the front of the original received-message-list;
4: Receive "exe and mem state" of the migrating process;
5: Restore process state;
6: inform the scheduler restore_complete;
7: wait for contents of the PL table and old_vmid from the scheduler;
8: inform the scheduler migration_commit.

9. The computer-readable media or memory having software embodied therein of claim 1 wherein the combined data communications protocols and process migration protocols function to provide maintenance of correct message order and updating of process location information during process migration.

10. A method for controlling message traffic and transfer of a migrating process from a first computer to a second computer in a distributed computing virtual machine environment, the environment including peer processes on computers in the virtual machine in addition to the first computer and the second computer, the software comprising communications protocols and process migration protocols allowing point-to-point communication between computers; the software being an independent layer over standard communication protocols and operating systems of the computers in the virtual machine; in which all processes have a memory allocation for their message storage, the method comprising the steps of:
a) granting a communication connection to enable migration of the migrating process in the first computer to migrate to the second computer;
b) sending out marker messages from the migrating process to each connected peer process with which the migrating process is in communication, the marker messages indicating the migrating process has sent its last message;
c) loading an executable copy of the migrating process programming on the second computer;
d) having peer processes respond to the marker message with an acknowledgement message;
e) having the migrating process close communication with a peer process when that peer process acknowledgement message is received by the migrating process;
f) having the first computer perform migration operations including sending the Execution state, Memory state, and Communications state of the migrating process to an initialized process on the second computer when all peer process communications are closed;
g) refusing peer process connection requests to the migrating process during migration operations;
h) having the peer processes, upon receiving a refusal to a connection request, request new location information of the migrating process;
i) rerouting all refused peer process messages during migration operations to the initialized process and compiling the rerouted messages in order in a memory location of the initialized process;
j) restoring all migrating process memory and communication states in the second computer to create a migrated process;
k) resuming execution of the migrated process on the second computer; and
l) updating the location of the migrated process for each peer process requesting a connection to the migrated process.

11. The computer-readable media or memory having software embodied therein for controlling message traffic and migration of a process, the process including an execution state, a memory state and a communication state; from a first computer to a second computer in a distributed computing virtual machine, the virtual machine including a scheduler, peer processes in addition to the process intended for migration, and FIFO communication links between processes, comprising:
a) communications protocols and process migration protocols allowing point-to-point communication between processes;
b) the software being an independent layer over standard communication protocols and operating systems of the virtual machine;
c) all processes are allotted a received-message-list memory location in which messages for their processes can be stored;
d) when a migration request is granted for the process in the first computer to migrate to the second computer the process in the first computer becomes a migrating process, the migrating process then sends out marker messages to each connected peer process with which it is in communication indicating the migrating process has sent its last message;

e) the connected peer processes receive messages from the FIFO communication link, store them in order into the receive-message-list, and acknowledge the migrating process marker message with their own marker message;

f) the migrating process receives messages from the FIFO communication link and stores them in order into the receive-message-list until all the acknowledgement marker messages from the connected peers are received, whereafter the communication link between the acknowledging connected peer processes and the migrating process is closed;

g) when all connected peer process communication links with the migrating process are closed, migration operations begin to transfer the migrating process from the first computer to the second computer;

h) migration operations include the virtual machine verifying that the second computer has an initialized process as an executable copy of the migrating process, whereupon the migrating process sends at least its received-message-list as the communication state of the process to the initialized process, and the execution state and memory state of the migrating process are gathered from the migrating process and sent to the second computer for use by the initialized process;

i) peer process connection requests for a communications link to the migrating process are refused during migration operations, a peer process upon receiving a refusal to its connection request will request from the scheduler a new location of the initialized process at the second computer, whereby all message traffic during migration is routed to the initialized process in the second computer and stored in order of receipt in the received-message-list of the initialized process;

j) all process execution, memory, and communication states are restored in the second computer to create a migrated process;

k) the reconstruction of the communication state of the process on the second computer is accomplished by inserting the content of the receive-message-list sent from the migrating process on the first computer to the front of the receive-message-list of the initialized process on the second computer; and l) migrated process location information is updated in each peer process which has been informed of the migrated process location.

12. The computer-readable media or memory having software embodied therein for controlling message traffic and migration of a process, the process including an execution state, a memory state and a communication state; from a first computer to a second computer in a distributed computing virtual machine, the virtual machine including a scheduler, peer processes in addition to the process intended for migration, and FIFO communication links between processes, comprising:

a) communications protocols and process migration protocols allowing point-to-point communication between processes;

b) the software being an independent layer over standard communication protocols and operating systems of the virtual machine;

c) the communication protocols having algorithms including:

i) a Connect algorithm for managing connection requests, denials and rerouting requests between sender and receiver computers, ii) a Send algorithm for allowing a sender computer to send messages to a receiver computer by verifying that a sender computer connection is established with a receiver computer process before messages are exchanged, and the send algorithm coded as:
send (m. dest)
1: if (dest>Connected) then
2: cc[dest]=connect (dest);
3: end if
4: send m along the cc[dest]communication channel:

iii) a Receive algorithm for managing transfer of messages between peer processes whether said processes have migrated or not; managing communication link maintenance or cancellation, and storing of messages in the correct order in a received-message-list of a particular process; and d) the process migration protocol having algorithms including:

i) a Migration algorithm for informing the scheduler of a process migration; managing acceptance of communications link between processes during migration operations; managing the gathering of the execution, memory, and communication state of the migrating process, and ii) an Initialization algorithm for restoring the execution, memory, and communication state of the migrating process as necessary to restart the migrating process at the second computer.

13. The computer-readable media or memory having software embodied therein of claim 12 wherein the Connect algorithm is coded as:
connect (dest)
1: while (dest>Connected) do
2: send conn_req to pl[dest];
3: if (receive conn_ack from pl[dest]);
4: cid:=make_connection_with (pl[dest]);
5: Connected:={dest}U Connected
6: else if (receive conn_req from any process p) then
7: grant-connection_to(p);
8: else if (receive conn_nack from pl[dest]) then
9: consult scheduler for exe status and new.vmid of $P_{dest}$
10: if (status=migrate) then
11: pl[dest].:=new.vmid;
12: else report "error: destination terminated';
13: return error; end if
14: end if; end if; end while;
17: return cid.

14. The computer-readable media or memory having software embodied therein of claim 13 wherein the Receive algorithm is coded as:
recv (src, m, tag)
1: While (m is not found) do
2: if (m is found in received_message_list) then
3: return m, delete it from the list, and return to a caller function;
4: end if
5: get a new data or control message, n;
6: if (n is data message) then
7: append n to received_message_list;
8: else (handle control messages)
9: if n is con req then
10: grant_connection_to(sender of n);
11: else if n is peer_migrating then
12: close down the connection with the sender of peer_migrating;
13: end if; end while.

15. The computer-readable media or memory having software embodied therein of claim 14 wherein the Migration algorithm is coded as:

migrate ()
1: if (migrate_request is received) then
2: inform the scheduler migration_start
3: get new vmid of $P_i$ from scheduler;
4: All con-req arrived beyond this point will be rejected;
5: Send disconnection signal and peer-migrating
6. Receive incoming messages to received-message-list until getting end-of-messages
7: close all existing connections;
8: Send received-message-list to the new process;
9: perform exe and memory state collection;
10: Send the exe and memory state to the new process;
11: wait for migration_commit msg from scheduler;
12: cooperate with the virtual machine daemon to make sure that no more con_req control message left to reject;
13: terminate;
14: end if.

16. The computer-readable media or memory having software embodied therein of claim 15 wherein the Initialization algorithm is coded as:

initialize( )
1: All con_req messages are accepted beyond this point;
2: Receive received-message-list of the migrating process;
3: insert received-message-list to the front of the original received-message-list;
4: Receive "exe and mem state" of the migrating process;
5: Restore process state;
6: inform the scheduler restore_complete;
7: wait for contents of the PL table and old_vmid from the scheduler;
8: inform the scheduler migration_commit.

17. A method for controlling message traffic and transfer of a migrating process from a first computer to a second computer in a distributed computing virtual machine environment, the environment including peer processes on computers in the virtual machine in addition to the first computer and the second computer, the software comprising communications protocols and process migration protocols allowing point-to-point communication between computers; the software being an independent layer over standard communication protocols and operating systems of the computers in the virtual machine; in which all processes have a memory allocation for their message storage, the method comprising the steps of:

a) granting a migration of the migrating process in the first computer to migrate to the second computer;

b) loading an executable copy of the migrating process programming on the second computer and wait for the execution, memory, and communication state information of the migrating process;

c) sending out marker messages from the migrating process to each connected peer process with which the migrating process is in communication, the marker messages indicating the migrating process has sent its last message;

d) having peer processes receive incoming messages from the migrating process into its received-message-list until the marker message from the migrating process is received and respond to the marker message with an acknowledgement message;

e) having the migrating process receive incoming messages from the peer processes into its received-message-list until the marker messages from all the connected peer processes are received and close communication with a peer process when that peer process acknowledgement message is received by the migrating process;

f) having the first computer perform migration operations including sending the Execution state, Memory state, and Communications state of the migrating process to an initialized process on the second computer when all peer process communications are closed;

g) refusing peer process connection requests to the migrating process during migration operations;

h) having the peer processes, upon receiving a refusal to a connection request, request new location information of the migrating process from the scheduler;

i) updating the location of the migrated process for each peer process requesting a connection to the migrated process, j) rerouting all refused peer process messages during migration operations to the initialized process and compiling the rerouted messages in order in a memory location of the initialized process;

k) restoring all migrating process execution, memory, and communication states in the second computer to create a migrated process; and l) resuming execution of the migrated process on the second computer.

* * * * *